(12) United States Patent
Brahim

(10) Patent No.: US 7,379,457 B2
(45) Date of Patent: May 27, 2008

(54) TECHNIQUE FOR IMPLEMENTING A VIRTUAL PRIVATE OPTICAL SWITCHED TRANSPORT NETWORK USING VIRTUAL PRIVATE OPTICAL/TDM CROSS-CONNECT TECHNOLOGY

(75) Inventor: Hamid Ould Brahim, Kanata (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 637 days.

(21) Appl. No.: 10/326,109

(22) Filed: Dec. 23, 2002

(65) Prior Publication Data

US 2003/0228147 A1 Dec. 11, 2003

Related U.S. Application Data

(60) Provisional application No. 60/387,470, filed on Jun. 10, 2002.

(51) Int. Cl.
*H04L 12/28* (2006.01)
*H04L 12/56* (2006.01)

(52) U.S. Cl. .................................. 370/390; 370/255

(58) Field of Classification Search ................ 370/254, 370/255, 298, 395.5, 392
See application file for complete search history.

(56) References Cited

U.S. PATENT DOCUMENTS

| | | | | |
|---|---|---|---|---|
| 5,742,587 | A * | 4/1998 | Zornig et al. .............. | 370/235 |
| 5,809,129 | A * | 9/1998 | Andersson et al. .... | 379/221.06 |
| 6,061,334 | A * | 5/2000 | Berlovitch et al. ......... | 370/255 |
| 6,097,087 | A * | 8/2000 | Farnworth et al. .......... | 257/698 |
| 6,226,751 | B1 * | 5/2001 | Arrow et al. ................. | 726/15 |
| 6,535,489 | B1 * | 3/2003 | Merchant et al. ........... | 370/244 |
| 6,807,179 | B1 * | 10/2004 | Kanuri et al. .......... | 370/395.31 |
| 2002/0078215 | A1 * | 6/2002 | Tahan ........................ | 709/229 |
| 2002/0097730 | A1 * | 7/2002 | Langille et al. ............. | 370/401 |
| 2002/0191602 | A1 * | 12/2002 | Woodring et al. .......... | 370/389 |
| 2003/0189905 | A1 * | 10/2003 | Lee ............................ | 370/254 |
| 2005/0169179 | A1 * | 8/2005 | Antal et al. ................. | 370/231 |

FOREIGN PATENT DOCUMENTS

WO  98/17034  4/1998

OTHER PUBLICATIONS

I. M. Leslie, "Shrinking network development time-scales: flexible virtual networks," Electronics & Communication Engineering Journal, Jun. 1999, pp. 149-153.
International Search Report dated Feb. 5, 2004 for Application No. PCT/CA03/00638.

(Continued)

*Primary Examiner*—Kwang Bin Yao
*Assistant Examiner*—Warner Wong
(74) *Attorney, Agent, or Firm*—Hunton & Williams, LLP

(57) ABSTRACT

A technique for implementing a virtual private optical switched transport network using virtual private optical cross-connect technology is disclosed. In one particular exemplary embodiment, the technique may be realized by a method comprising the steps of partitioning a network into a plurality of partitions; assigning each partition to a customer; and exclusively controlling the partition assigned to each customer for establishing a private switched network by allowing each customer to exclusively control each respectively assigned partition, wherein each partition comprises at least one virtual private optical cross connect for virtualizing at least one resource.

13 Claims, 12 Drawing Sheets

OTHER PUBLICATIONS

Hamid Ould-Brahim, et al., GVPN: Generalized Provider-Provisioned Port-Based VPNs Using BGP and GMPLS, http://www.ietf.org/internet-draft-ouldbrahim-ppvpn-gvpn-bjpgmpls-02, pp. 1-19, Dec. 2002, "Work In Progress".

Hamid Ould-Brahim, et al., VPOXC Provider Provisioned Virtual Private Optical Cross-Connect Service, http://www.ieft.org.internet-draft-ouldbrahim-ppvpn-vpoxc-01.txt, pp. 1-9, Jun. 2002, "Work In Progress".

* cited by examiner

US 7,379,457 B2

TECHNIQUE FOR IMPLEMENTING A VIRTUAL PRIVATE OPTICAL SWITCHED TRANSPORT NETWORK USING VIRTUAL PRIVATE OPTICAL/TDM CROSS-CONNECT TECHNOLOGY

CROSS-REFERENCE TO RELATED APPLICATIONS

This patent application claims priority to U.S. Provisional Patent Application No. 60/387,470, filed Jun. 10, 2002, which is hereby incorporated by reference herein in its entirety.

FIELD OF THE INVENTION

The present invention relates generally to controlling a virtual private optical/Time Division Multiplexing (TDM) switched transport networks and, more particularly, to a technique for implementing virtual private optical/TDM switched transport network using virtual private optical cross-connect technology.

BACKGROUND OF THE INVENTION

Due to recent developments in fiber-optics-based networks and carrier virtual private network technologies, optical virtual private network (OVPN) services are currently being explored in the industry. Most call-based network architectures currently deployed are designed towards providing a basic unit of service that usually entails providing connectivity between two network public entry endpoints. The set of services and associated network architecture are based on a call based model and require architectural building blocks that are call centric.

The call based model is characterized by an emphasis on bandwidth and connectivity, achieved generally through complex in-house built dedicated network solutions. As a result, the architecture is very expensive. Under the call based model, connectivity services are generally transport dependent type services. Oftentimes, these services require major and expensive upgrades to the transport technology used.

Currently, virtual private network (VPN) architectures built around the call based model focus on restricting connectivity to a group of users (e.g., closed-user group). Mechanisms used in these architectures are call centric, which involves a user subscribing to a closed-user group and a network defining a set of rules for incoming and outgoing calls to/from the group to an open portion of the network.

Call-based architectures have traditionally minimized or ignored the importance of providing carrier based VPN services that offer complete client flexibility, reduce operational complexity and introduce new added-value services beyond basic point-to-point connectivity.

In view of the foregoing, it would be desirable to provide a technique for implementing virtual private optical switched transport network using virtual private optical/TDM cross-connect technology which overcomes the above-described inadequacies and shortcomings. More particularly, it would be desirable to provide a technique for implementing virtual private optical switched transport network using virtual private optical cross-connect technology in an efficient and cost effective manner.

SUMMARY OF THE INVENTION

According to the present invention, a technique for implementing virtual private optical switched transport network using virtual private optical/TDM cross-connect technology is provided. In one particular exemplary embodiment, the technique may be realized by a method for implementing a virtual private optical switched transport network using virtual private optical cross-connect technology, comprising the steps of partitioning a network into a plurality of partitions; assigning each partition to a customer; and establishing a private switched network by allowing each customer to exclusively control each respectively assigned partition, wherein each partition comprises at least one virtual private optical cross connect for virtualizing at least one resource.

In accordance with other aspects of this particular exemplary embodiment of the present invention, the network is partitioned by a service provider; the customer is a private network running Generalized Multi-Protocol Label Switching; the method further comprises the step of adjusting bandwidth associated with the private switched network based on at least one of an addition and a removal of at least one site to the virtual private optical cross connect; the method further comprises the step of defining a virtual private optical cross connect topology to be supported by the service provider, wherein each customer defines the topology; the virtual private optical cross connect is implemented at one of a node level and a network level; the method further comprises the step of provisioning customer optical connections at real time using label switch paths and the step of dynamically configuring the private switched network via dynamic routing.

According to another particular exemplary embodiment, a computer signal embodied in a carrier wave readable by a computing system and encoding a computer program of instructions for executing a computer process performing the method recited above.

According to another particular exemplary embodiment, a system for implementing a virtual private optical switched transport network using virtual private optical cross-connect technology comprises a network having a plurality of partitions, wherein a private switched network is established by allowing each customer to exclusively control each respectively assigned partition; and at least one virtual private optical cross connect for virtualizing at least one resource associated with each partition.

In accordance with other aspects of this particular exemplary embodiment of the present invention, the network is partitioned by a service provider; the customer is a private network running Generalized Multi-Protocol Label Switching; bandwidth associated with the private switched network is adjusted based on at least one of an addition and a removal of at least one site to the virtual private optical cross connect; the customer defines a virtual private optical cross connect topology to be supported by the service provider; the virtual private optical cross connect is implemented at one of a node level and a network level; customer optical connections are provisioned at real time using label switch paths; and the private switched network is dynamically configured via dynamic routing.

According to another particular exemplary embodiment, an article of manufacture for implementing a virtual private optical switched transport network using virtual private optical cross-connect technology comprises at least one processor readable carrier; and instructions carried on the at least one carrier; wherein the instructions are configured to be readable from the at least one carrier by at least one processor and thereby cause the at least one processor to operate so as to: partition a network into a plurality of partitions; assign each partition to a customer; and establish a private switched network by allowing each customer to exclusively control each respectively assigned partition, wherein each partition comprises at least one virtual private optical cross connect for virtualizing at least one resource.

In accordance with other aspects of this particular exemplary embodiment of the present invention, the customer is a private network running generalized multi-protocol label switching and the at least one processor operates so as to adjust bandwidth associated with the private switched network based on at least one of an addition and a removal of at least one site to the virtual private optical cross connect.

The present invention will now be described in more detail with reference to exemplary embodiments thereof as shown in the appended drawings. While the present invention is described below with reference to preferred embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENT(S)

Figure 1:
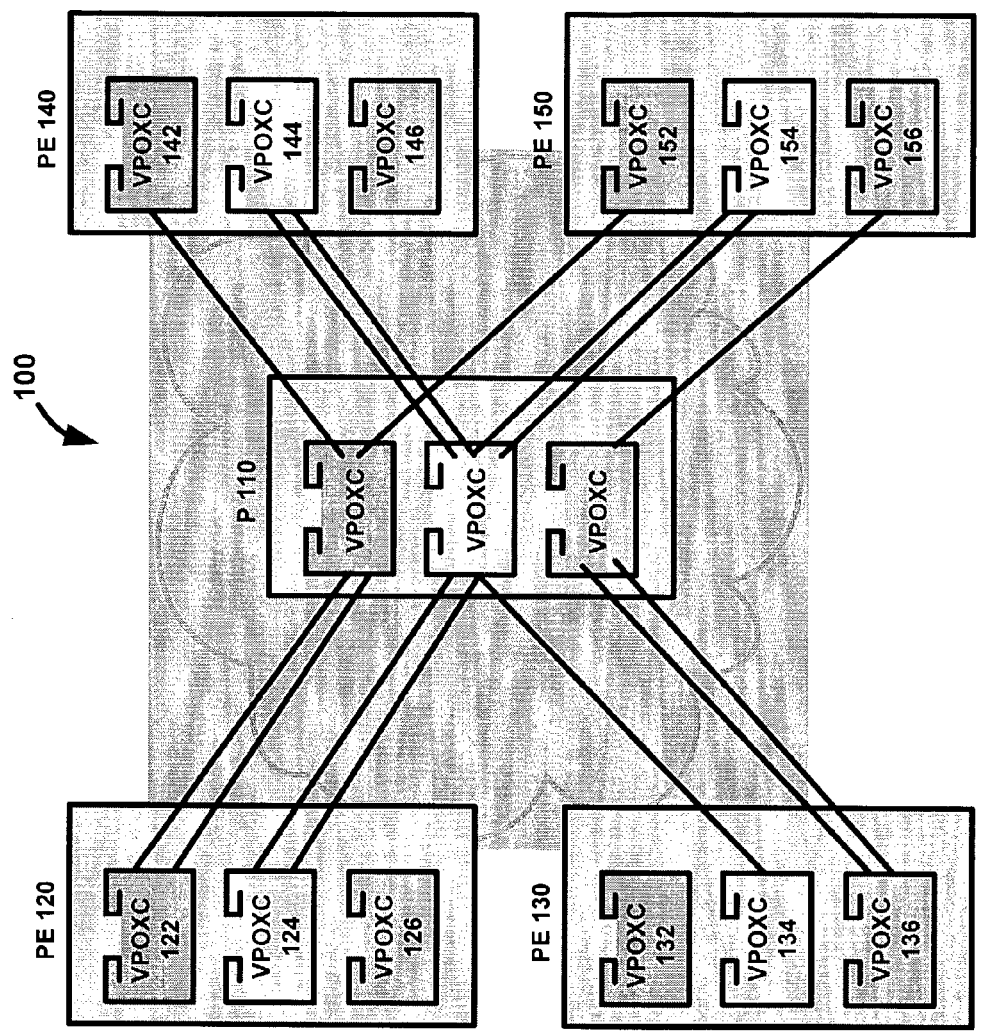
FIG. 1 is a diagram illustrating a virtual private switched transport network (VPSTN) using virtual private optical cross-connects (VPOXC) in accordance with an embodiment of the present invention.

According to an embodiment of the present invention, a network of optical/time division multiplexing (TDM) cross-connects where a service provider partitions the network into disjoint physical resource sets (e.g., ports, links, switching capabilities) is disclosed. The service provider may assign each partition to a given customer (or client). The customer exclusively controls the assigned partition and may assign its own private addressing to each port of the partition. In addition, the customer may operate the partition as a switched partition by running routing as well as signalling protocols over the assigned partition. The partition along with associated switched features may constitute a private switched transport network (PSTN) service. Since PSTNs may share the same physical provider internal nodes and/or physical links while remaining logically isolated from each other, the PSTN service may be referred to as a virtual private switched transport network (VPSTN) service.

A VPSTN may be a provider provisioned virtual private network (VPN) service built by a service provider and operated by a client. A VPN may include a set of users (e.g., devices attached to a network) sharing common membership information and establishing inter-site connectivity within a group. A user may be a member of multiple groups (e.g., VPNs). A VPN may also be a client private network that subscribes to restricted connectivity services. In addition, a VPN may be a customer with a multi-site environment subscribing to connectivity services provided through a shared network infrastructure. Optical VPN (OVPN) may include synchronous optical network technologies/synchronous digital hierarchy (Sonet/SDH) technologies where a basic unit of service involves optical/TDM physical connections between two endpoints (e.g., sites). In OVPNs, service is physical where control mechanisms may be shared among a set of users where internal resources for path establishment may be transparent to VPN users.

To make each partition an automated switched partition running within a private network, a service provider may configure one or more virtual private optical cross-connects (VPOXCs) on each internal node and/or set of provider nodes. VPSTN topology may be controlled automatically through a network of VPOXCs running on provider nodes which appear as normal nodes within the private network. Basically, a VPOXC virtualizes resources of one or more provider physical cross-connects (e.g., VPOXC on one node is a simple VPSTN deployment). A VPOXC may be similar to a virtual router in layer-3 VPNs, for example, where the VPOXC may be instantiated at a network level where all the feature sets of a traditional virtual router are not required. Therefore, VPOXC may run a subset of Generalized Multi-Protocol Label Switching (GMPLS) based routing and signalling where attached links are not packet-based capable links. In another example, clients may own VPOXC-to-VPOXC links. These links offer a great level of abstraction at a link network and a network level. These links may also be traffic engineering-label switch paths (TE-LSPs), for example. Therefore, a provider internal network topology may be completely abstracted from the VPSTN.

FIG. 1 is a diagram illustrating a VPSTN using virtual private optical cross-connects (VPOXC) in accordance with an embodiment of the present invention. Provider node 110 may include one or more VPOXC devices, such as VPOXC 112, VPOXC 114 and VPOXC 116. VPSTN 100 may further include a plurality of Provider Edge devices, as shown by PE 120, PE 130, PE 140 and PE 150. Each provider edge node may include one or more VPOXC devices. In particular, PE 120 may include VPOXC 122, VPOXC 124 and VPOXC 126. PE 130 may include VPOXC 132, VPOXC 134 and VPOXC 136. PE 140 may include VPOXC 142, VPOXC 144 and VPOXC 146. PE 150 may include VPOXC 152, VPOXC 154 and VPOXC 156.

A service provider network offering VPSTN services may include devices such as optical network element (ONE) which may be optical cross connects (OXCs), SONET/SDH Cross Connects or other similar devices. These devices may be partitioned into P (Provider) ONEs and PE (Provider Edge) ONEs, for example. The P ONEs may be connected to ONEs within a provider's network. The PE ONEs may be connected to ONEs within the provider network as well as to devices outside of the provider network. Such other devices may be referred to as client edge devices (CEs). An example of a CE may include a router, a SONET/SDH Cross Connect, an Ethernet switch or other similar device. To each CE port of the same VPN, the service provider may appear as a virtual private optical cross-connect where customer ports are attached to it. For the purpose of the VPSTN service, resources used to connect a CE to a VPSTN via the VPOXC PE may be represented as a traffic engineering (TE) link. As a result, constructs (e.g., link bundling, etc.) applicable to TE links are applicable here as well. For a given TE link that connects a CE to a (VPOXC) PE, an end point of the TE link connected to the CE may be referred to as CE port, while an end point of the TE link connected to the (VPOXC) PE may be referred to as VPOXC port.

Another VPSTN deployment referred to as network-based VPOXC deployment involves instantiating VPOXC using multiple resources distributed across a provider network. The VPOXC technology of the present invention allows resources to be grouped into a single instance of VPOXC.

Figure 2:
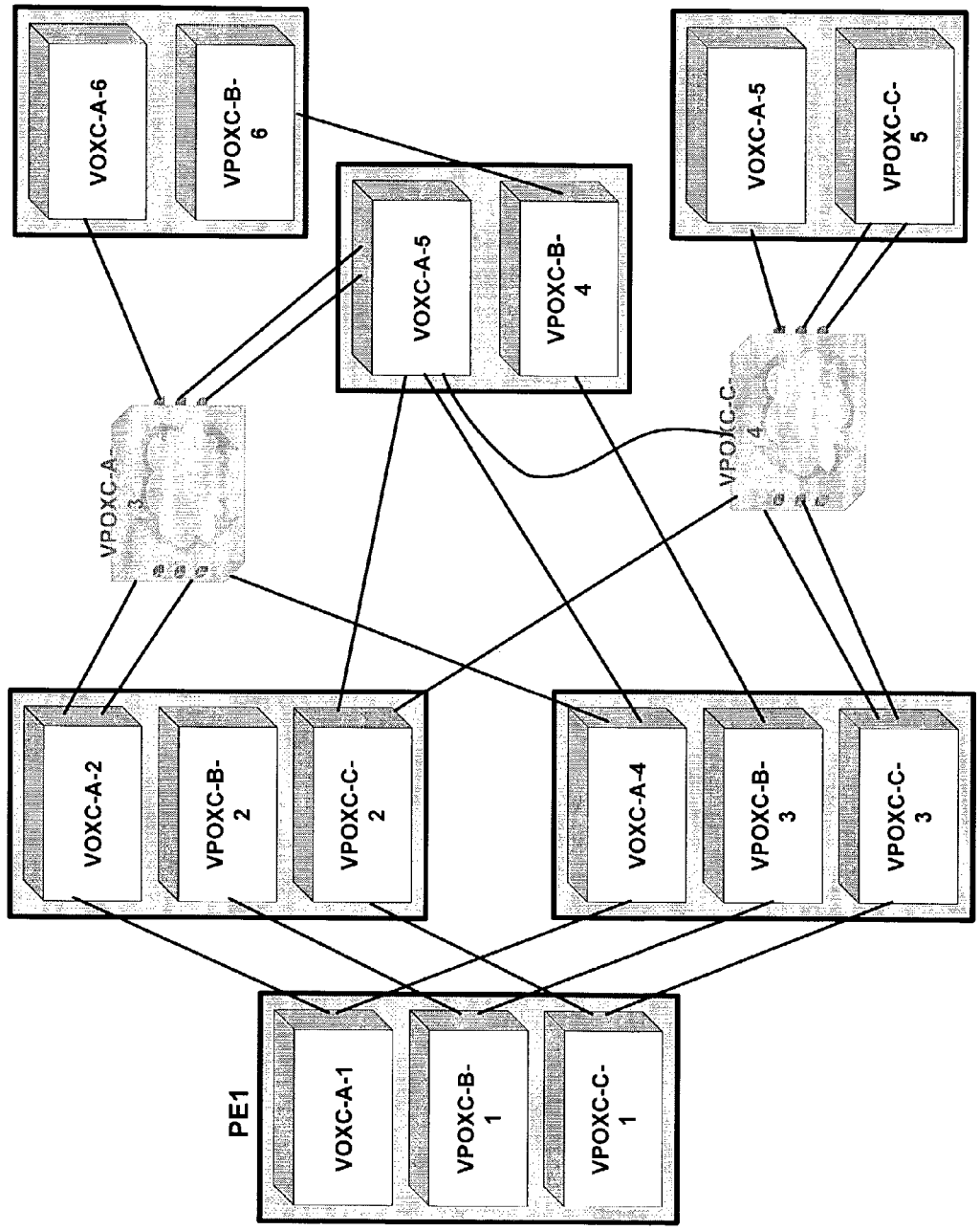
FIG. 2 is a diagram illustrating a VPSTN using network based VPOXC in accordance with an embodiment of the present invention.

FIG. 2 is a diagram illustrating a VPSTN using network based VPOXC in accordance with an embodiment of the present invention. On PE1, a VPOXC may be configured to run an instance of GMPLS for both routing and signaling. As an example, VPOXC-A-1 is connected to VPOXC-A-2 through a logical link. VPOXC-A-1 may run a routing protocol with VPOXC-A-2 that controls that link and learns about other links owned by the same VPN which VPOXC-A-1 and VPOXC-A-2 belong to FIG. 2 also shows that multiple resources from different provider devices may be grouped to form an instance of VPOXC which itself may be connected to other VPOXCs (e.g., network or node defined), as shown by VPOXC-A-3.

According to an embodiment of the present invention, VPSTN mode of operations is independent from a provider internal network mode of operations. VPSTN bandwidth may be increased/decreased without impacting provider/ private networks. The provider may also add/remove nodes/ links within a switched private partition without impacting client addressing. Thus, a VPOXC based VPSTN provides flexibility to the client and optimal scalability for the provider.

The VPSTN may implement a wide spectrum of port topologies, including a full mesh port topology (e.g., hub and spoke, arbitrary, etc) and other topologies. In addition, when the VPSTN uses VPOXCs that are instantiated at a network level, such VPOXC may also implement a wide range of port topologies.

In accordance with various embodiments of the present invention, the VPSTN provides support for overlapping/ private address space and efficient use of provider network resources where a VPOXC may be built using distributed provider resources. For scaling purposes, VPSTN may use a VPN auto-discovery to dynamically discover VPSTN resources (e.g., generalized virtual private network (GVPN), etc.). VPSTN further provides real-time provisioning of customer optical connections (e.g., label switch paths (LSP), etc.); dynamic VPSTN reconfiguration via dynamic routing including the VPSTN domain; support for traffic engineering within the VPSTN service without impacting traffic engineering on the provider network; versatile protection and restoration capabilities for VPSTN nodes; support for arbitrary mesh topology; complete VPSTN mobility through VPOXC mobility; and VPSTN/VPOXC dynamic bandwidth determination where VPSTN/VPOXC bandwidth is variable and may depend on network available bandwidth. VPOXC mobility may refer to the ability to move the VPOXC from one PE to another as well as one provider to another without impacting the VPOXC and client network addressing.

Other advantages of various embodiments of the present invention may include clients having the ability to monitor VPSTN and VPOXCs operations using defined tools; support of a range of security capabilities for private control traffic; support of a range of quality of service (QoS) capabilities; smooth interworking with port-based OVPNs (e.g., GVPN, etc.); use of VPOXC technology at a node level and at a network level where a VPOXC may be built from multiple physical resources partitioned among a set of physical cross-connects; network independence between VPSTNs and provider networks; support for online/offline traffic engineering per VPSTN running on a customer network; and support for inter-service provider VPSTNs. In addition, multiple services may be provided on a single VPSTN where a VPSTN customer may provide VPOXC services and/or other OVPN services. Addition of a new VPSTN resource will not impact other VPSTNs. Addition/ removal of a VPOXC part of a VPSTN will not impact other VPSTNs and a service provider network. Provider internal network operations may be completely isolated from VPSTN customer network operations. VPSTNs and VPOXCs may be used in multiple types of networks that include optical metro, access and long haul networks and/or other networks. Flexible mobility between VPSTNs/ VPOXCs and provider network equipment may also be achieved through various embodiments of the present invention.

VPOXC allows virtualization of physical optical cross-connect nodes. A VPOXC may be a provider provisioned VPN service built by a service provider and operated by a client. A VPOXC may operate similarly to a physical optical cross-connect where the VPOXC uses shared resources and may be deployed at a node level or a network level. When the VPOXC is deployed at the node level, each VPOXC may represent an instance of a network routing and signaling control planes applied to a physical partition of the node resources. This deployment is similar to a virtual router VPN solution with he difference that VPOXC may run open shortest path first/Intermediate System to Intermediate System (OSPF/ISIS) (or interior gateway protocol (IGP), etc.) traffic engineering extensions and VR-to-VR tunnels may be physical links and/or traffic engineered LSPs. The VPOXC may also be built at the network level where VPOXC resources may be distributed across the network.

To a VPOXC customer, the service provider network may appear as one or more virtual private optical cross-connects attached to customer sites. A VPOXC port topology may be defined by a customer (or client) and enforced by a service provider. Customers may use (G)MPLS based signaling to signal any optical connectivity according to a topology implemented by the VPOXC. Client devices may operate within a VPOXC space independently from the service provider network operations. For example, the VPSTN may inherit features of the VPOXC in terms of network independence. VPOXC may be instantiated on one or more physical devices. A customer may own one or more VPOXCs and build routing peering between the VPOXCs within a private network.

In another example, to a service provider, the customer may appear as a private network running GMPLS, for example. The service provider may appear as a virtual node part of the customer's network to the customer. The customer may use private addresses for establishing connectivity. The customer may also request OVPN services to include online/offline TE information. As a result, any internal client device may initiate a TE-LSP. A customer LSP may cross multiple interface switching environments (e.g., packet-based, TDM, etc.). A provider network may be completely abstracted by the VPOXC.

In yet another example, a provider's view of the customer may be a private network of SONET/SDH switches using GMPLS where the provider is SONET/SDH based. The customer may establish TDM connections where the VPOXC is a SONET/SDH switch using GMPLS as well. In another example, a provider's view of the client may be a private network of routers using GMPLS. The customer may establish a packet-based LSP connection where the provider provides SONET/SDH switching infrastructure. The VPOXC, in this example, may be a TDM switch using GMPLS.

Bandwidth associated with each VPSTN/VPOXC may depend on various factors, such as an access bandwidth of each CE to the VPOXC available bandwidth on each physical provider node and the number of VPOXCs used with a VPSTN. Another factor affecting bandwidth may include port topology implemented within the VPOXC and within each VPSTN. As sites are added or removed to the VPOXCs, a total VPOXC bandwidth may be accordingly adjusted. A typical deployment scenario may fully mesh the ports of a VPOXC.

A VPSTN customer may define a VPOXC topology to be supported by a service provider. The VPOXC itself may impose a given port topology when used in a network-based deployment scenario. Within a VPSTN topology, the customer may select and control any connectivity topology. The provider may restrict and constrain port-to-port connectivity according to the topology implemented within the VPSTN.

Reachability distribution within a VPSTN may be achieved by running an instance of routing per VPOXC basis. VPOXC private routes may be tunneled when inter-VPOXC is achieved through shared control channels. In the context of network-based VPOXC deployment, route distribution mechanisms may be used. For example, two route distribution mechanisms may include (1) RFC2547bis distribution of VPOXC routes using border gateway protocol (BGP) multi-protocol (MP) extensions and (2) a virtual router distribution style which establishes control links between adjacent VPOXCs and runs an instance of routing between the VPOXCs.

In the case of RFC2547bis, each VPOXC route along with an associated TE profile may be piggybacked on a BGP instance of a provider network. When the VPOXC is instantiated at a network level, an auto-discovery mechanism may disseminate VPOXC reachability information to other VPOXCs that are part of the same VPSTN network.

Figure 3:
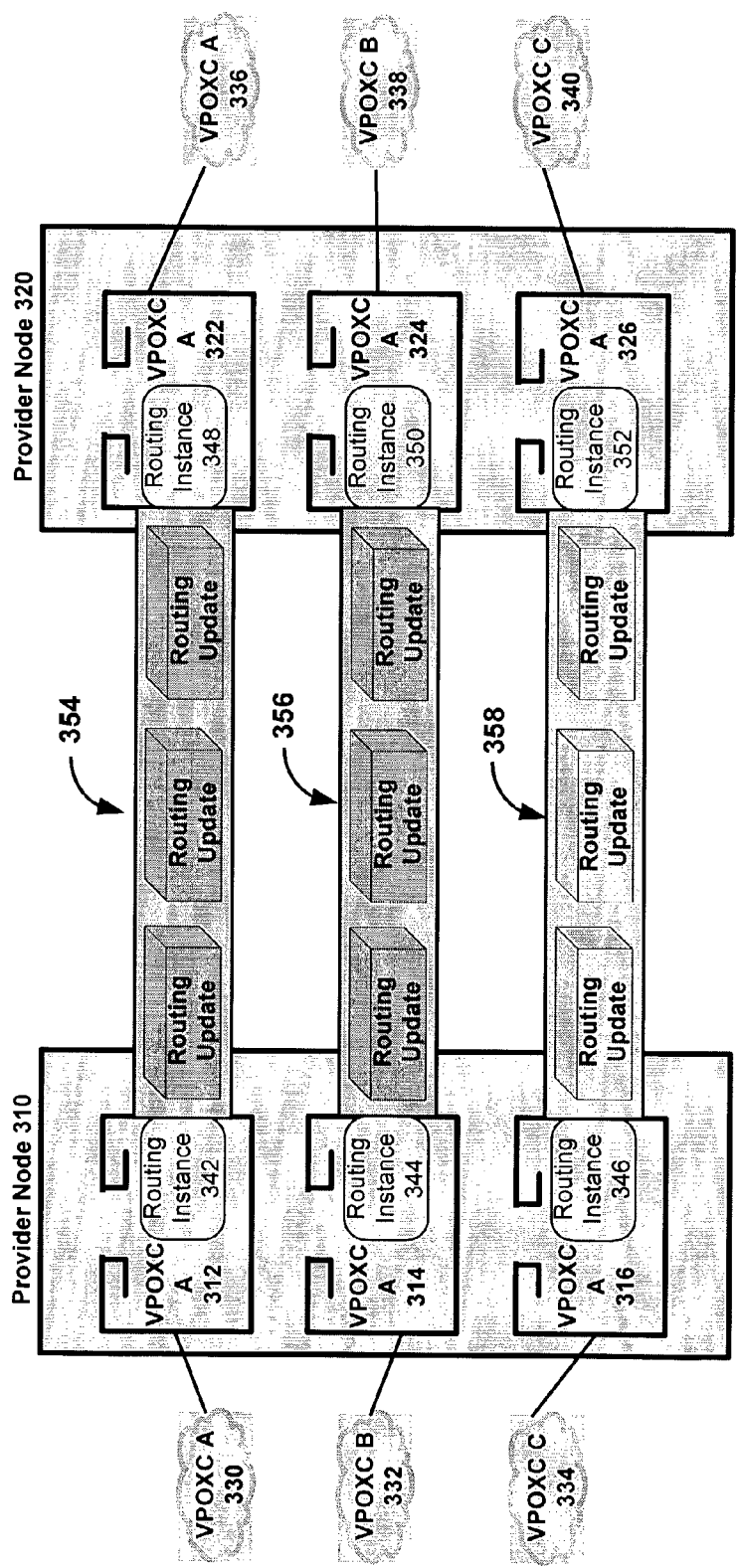
FIG. 3 is a diagram of a VPSTN reachability distribution in accordance with an embodiment of the present invention.

FIG. 3 is a diagram of a VPSTN reachability distribution in accordance with an embodiment of the present invention. Provider node 310 may be connected to Provider node 320 via backbones, which may include channels 354, 356 and 358 for communicating routing update information for VPOXCs. Provider Node 310 may include VPOXC 312, VPOXC 314 and VPOXC 316. VPOXC 312 may be connected to a VPOXC 330 domain, VPOXC 314 may be connected to a VPOXC 332 domain and VPOXC 316 may be connected to a VPOXC 334 domain. Provider Node 320 may include VPOXC 322, VPOXC 324 and VPOXC 326. VPOXC 322 may be connected to a VPOXC 336 domain, VPOXC 324 may be connected to a VPOXC 338 domain and VPOXC 326 may be connected to a VPOXC 340 domain.

Each VPOXC 312, 314 and 316 may also include a routing instance, as shown by 342, 344 and 346 respectively. Similarly, each VPOXC 322, 324 and 326 may also include a routing instance, as shown by 348, 350 and 352 respectively. Routing instance 342 of VPOXC 312 and Routing instance 348 of VPOXC 322 may communicate routing update information via channel 354. Routing instance 344 of VPOXC 314 and Routing instance 350 of VPOXC 324 may communicate routing update information via channel 356. Routing instance 346 of VPOXC 316 and Routing instance 352 of VPOXC 326 may communicate routing update information via channel 358.

Each VPOXC within a VPSTN may be associated with one or more control channels used by CEs to request optical connections. A control channel may be addressed using addresses defined within a private network addressing space. For example, a control channel may be an Internet Protocol (IP) tunnel, Frame Relay (FR)/Asynchronous Transfer Mode (ATM) Virtual Circuits (VCs), etc. Each PE that provides multiple VPSTN services may have multiple control channels (e.g., one per VPOXC per VPSTN).

VPSTN ports may be identified by network layer addresses (e.g., Internet Protocol address version 4 (four bytes length) (IPv4), etc.) or by a combination of a PE ONE identifier and a port/interface index (e.g., IP unnumbered interfaces). CE ports that are attached to a given VPSTN may have identifiers that are unambiguous within the VPSTN since the VPSTN is a VPN, these identifiers are addresses unique only within the customer (VPN) network. A service provider may not assume that these identifiers are unambiguous outside of the VPSTN. For example, multiple VPSTN customers may have overlapping addresses assigned to the links they control. CE ports attached to a VPSTN (therefore VPOXC) may be identified by network layer addresses (e.g., IPv4, IPv6, network service access point (NSAP) addresses, etc.) or by a combination of a CE identifier and a port/interface index (e.g., IP unnumbered interfaces, etc.).

VPSTN addressing, routing, and signaling used by a service provider network offering a service may be completely independent from addressing, routing, and signaling used by one or more VPSTN clients of the network. Moreover, for the purpose of the VPSTN service, addressing, routing and signaling used by a VPSTN client are not required to be coordinated with any other VPSTN client.

Ports within a VPSTN are not required to have the same characteristics. However, ports with compatible characteristics may be connected (e.g., Gigabit Ethernet (GigE) port to GigE port, but not GigE port to optical carrier (OC)-48 port). Furthermore, administrative ownership of VPSTN ports may be orthogonal to VPN membership of these ports. A VPSTN may belong to the same organization or to multiple organizations. Ports within a VPSTN may belong to the same (e.g., intranet) or different (e.g., extranet) organizations. Associations between a CE with a particular VPSTN may be established/maintained by a provider's provisioning system and therefore may be changed via a provider's provisioning system.

A VPSTN port may be moved to another PE port (or even to another PE) without changing VPSTN addressing used by a customer to request optical connectivity. Addition, deletion and/or other changes associated with VPSTN port addresses do not require coordination with a service provider addressing scheme.

For network-based VPOXC deployment, VPOXC may implement mechanisms by which a given CE having at least one port associated with a given VPOXC may learn about other ports of the VPOXC, even if the ports are associated with other PE ONEs, and even if these other PE ONEs belong to other service providers. Furthermore, a service provider may provide a CE, having at least one port in a given VPOXC, with information related to other CE ports of the VPOXC, including information about various properties of the ports. Techniques developed in GVPN and BGP-OVPN, for example, may be used to implement this function.

Figure 4:
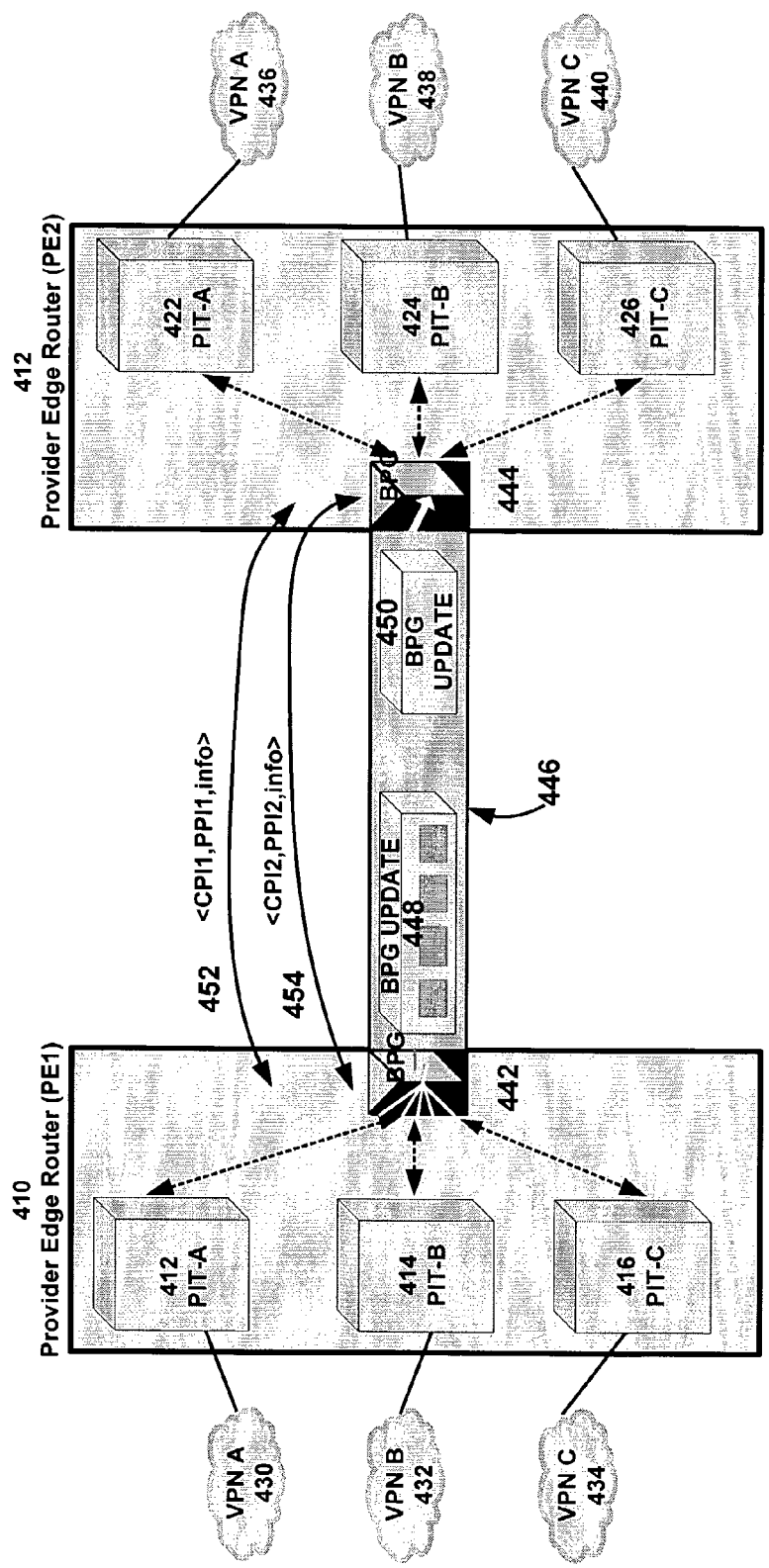
FIG. 4 is a diagram illustrating port discovery for a network-based VPOXC in accordance with an embodiment of the present invention.

FIG. 4 is a diagram illustrating port discovery for a network-based VPOXC in accordance with an embodiment of the present invention. Provider Edge Router 410 may include one or more port information tables, such as port information table (PIT) 412, PIT 414 and PIT 416. A PIT may be created for each VPN connected to a PE. PIT may be populated from local customer/provider port information (CPI/PPI) and/or through a VPN auto-discovery mechanism (e.g., Border Gateway Protocol with Multi-Protocol extensions (BGP-MP)). PIT 412 may support VPN 30; PIT 14 may support VPN 432 and PIT 416 may support VPN 434. Provider Edge Router 420 may include PIT 422, PIT 424 and PIT 426. PIT 422 may support VPN 436; PIT 424 may support VPN 438 and PIT 426 may support VPN 440. BGP refers to a protocol for exchanging routing information between gateway hosts (each with its own router) in a network. BGP 442 of Provider Edge Router 410 may communicate with BGP 444 of Provider Edge Router 420 by exchanging/providing BGP updates 448 and 450 via channel 446. Port information may be exchanged as illustrated by 452 and 454. In particular, customer port identifier (CPI) data, provider port identifier (PPI) data and other additional information may be exchanged via 452 and 454.

GMPLS signaling may be used to create inter-VPOXC connections or inter-CE connections within a VPSTN domain. For example, RSVP-TE or CR-LDP protocols may be implemented.

A VPSTN may be composed of a network of VPOXCs and TE-links. The TE-links may be built through physical, logical or optical connections. In the case of optical connections (e.g., label switch path (LSP), etc.), each optical connection may be advertised to a local VPOXC as a forwarding adjacency. For example, the forwarding adjacency allows at least two devices to treat the LSP/connection as a normal traffic engineering link without requiring configuration of a routing protocol on top of the connection. A VPSTN customer may aggregate multiple LSPs on top of an optical connection.

Figure 5:
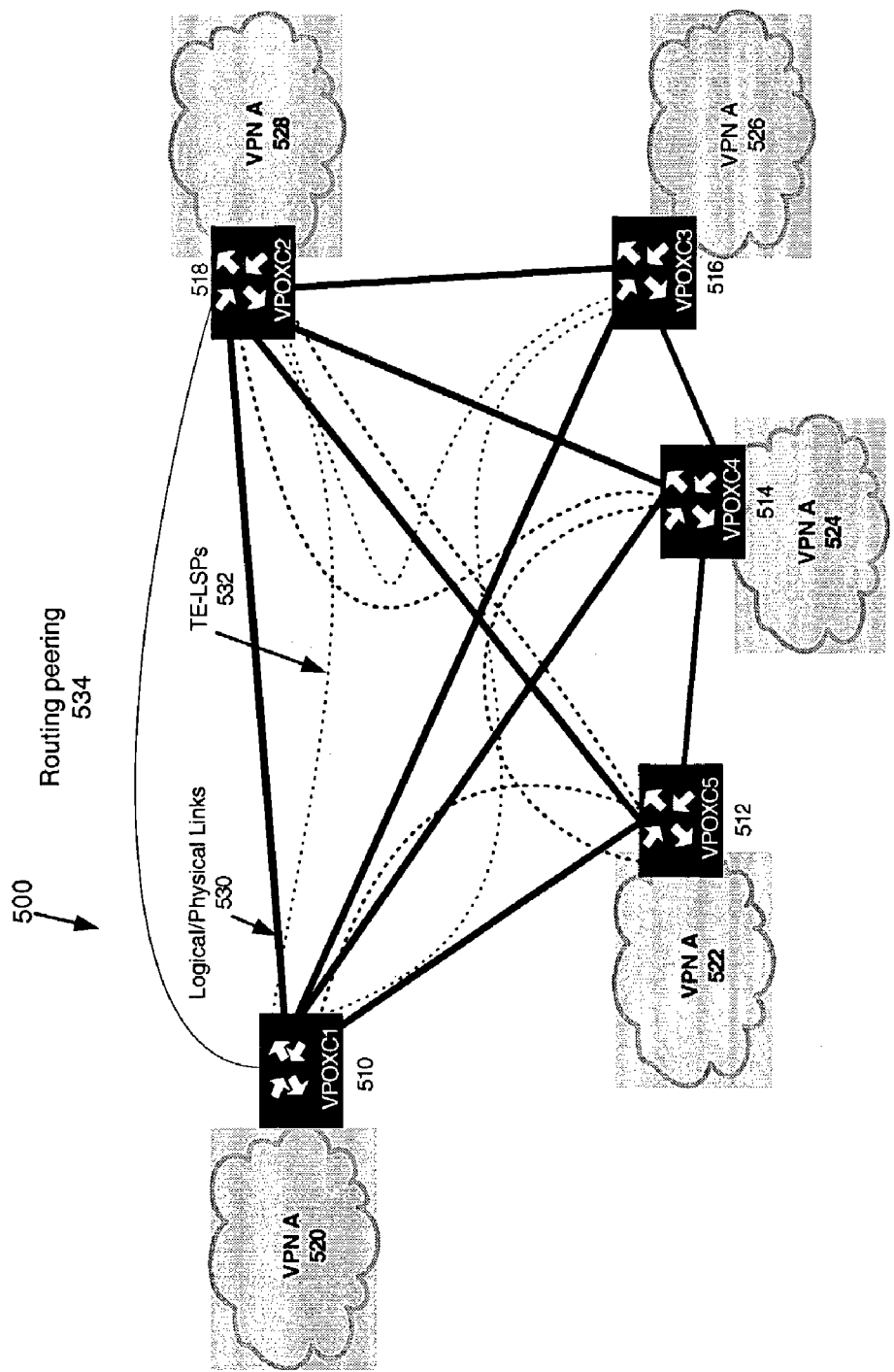
FIG. 5 is a diagram illustrating VPSTN links and connectivity in accordance with an embodiment of the present invention.

FIG. 5 is a diagram illustrating VPSTN links and connectivity in accordance with an embodiment of the present invention. VPOXC 510 is associated with VPN 520; VPOXC 512 is associated with VPN 522; VPOXC 514 is associated with VPN 524; VPOXC 516 is associated with VPN 526; and VPOXC 518 is associated with VPN 528. Logical/Physical links 530 may be used to connect a VPOXC with another VPOXC in VPSTN 500. TE-LSP links 532 may be used to provide optical connections between VPOXCs in VPSTN 500. Routing peering 534 (e.g., OSPF-TE, ISIS-TE, etc.) may be provided between VPOXCs.

Traffic engineering may be performed with on-line path computations where VPOXCs within a VPSTN may advertise available bandwidth to client internal nodes, which may include client devices and/or client owned VPOXCs. Routing protocol updates (e.g., OSPF-TE, ISIS-TE, etc.) may be exchanged between an edge VPOXC and CE routing.

Using online path computation, a node within a private domain may initiate a traffic engineered LSP that crosses a VPOXC domain. The LSP may be subject to a set of constraints, which may be resource oriented (e.g., bandwidth, etc.) or may be related to administrative constraints (e.g., selection of certain links, etc.). Distribution of topology may involve most or all links in a network, including VPOXC links. In addition, an internal service provider topology may be completed abstracted and invisible to the client.

According to an example of an embodiment of the present invention, a customer may be a carrier having a private network running GMPLS. In this VPSTN service example, the customer may own internal capacity using a partition of provider network resources (e.g., links, switching capacity, etc). The customer may request that the partition under its control is a switched partition running routing and signaling within the customer's domain. In addition, the customer may provide connectivity services on top of the customer's partition (e.g., VPSTN) to the customer's own customers.

Figure 6:
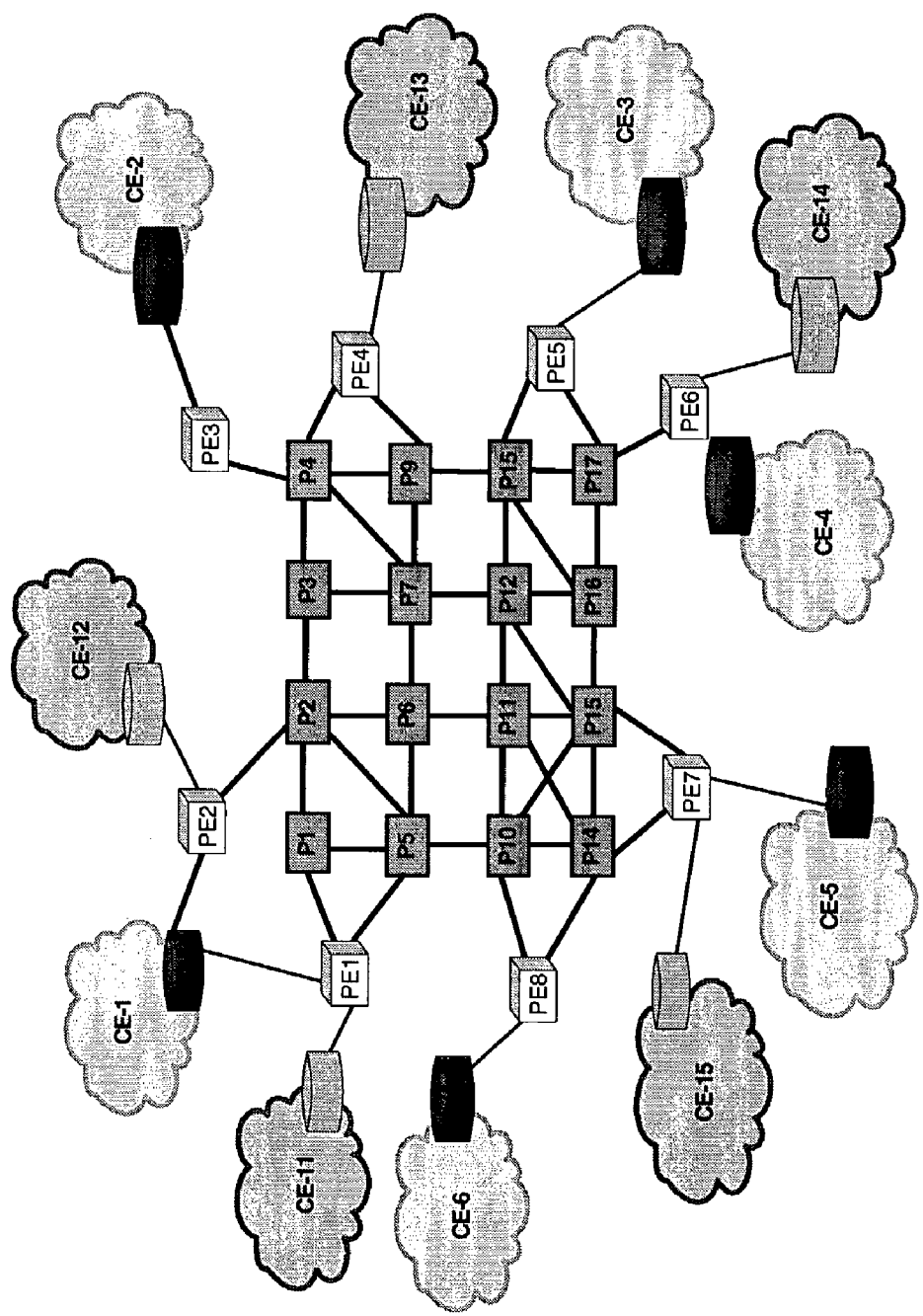
FIG. 6 is an example of multiple VPSTNs in accordance with an embodiment of the present invention.

FIG. 6 is an example of multiple VPSTNs in accordance with an embodiment of the present invention. Provider nodes are represented by P1, P2, P3, P4, P5, P6, P7, PB, P9, P10, P11, P12, P13, P14, P15, P16 and P17. Provider Edge nodes are represented by PE1 connected to P1 and P5; PE2 connected to P2; PE3 connected to P4; PE4 connected to P4 and P9; PE5 connected to P15 and P17; PE6 connected to P17; PE7 connected to P14 and P15; and PE8 connected to P10 and P14. Client Edge devices for a first VPSTN are represented by CE-1, CE-2, CE-3, CE-4, and CE-5. Client Edge devices for a second VPSTN are represented by CE-11, CE-12, CE-13, CE-14 and CE-15. The first VPSTN and the second VPSTN share network resources within a service provider network.

As shown in FIG. 6, each PE device and/or P device may reserve capacity for each customer. A first VPN which includes CE-1, CE-2, CE-3, CE-4 and CE-5 may represent a first VPSTN requiring a provider to allocate a partition within a provider's internal network. The partition may be switched within the first VPN. For example, PE1, PE2 . . . PE8 may maintain a first VPN state (e.g., ports allocated to the first VPN) and may maintain other VPSTN states (e.g., a second VPSTN including CE-11, CE-12, CE-13, CE-14 and CE-15) as well.

Figure 7:
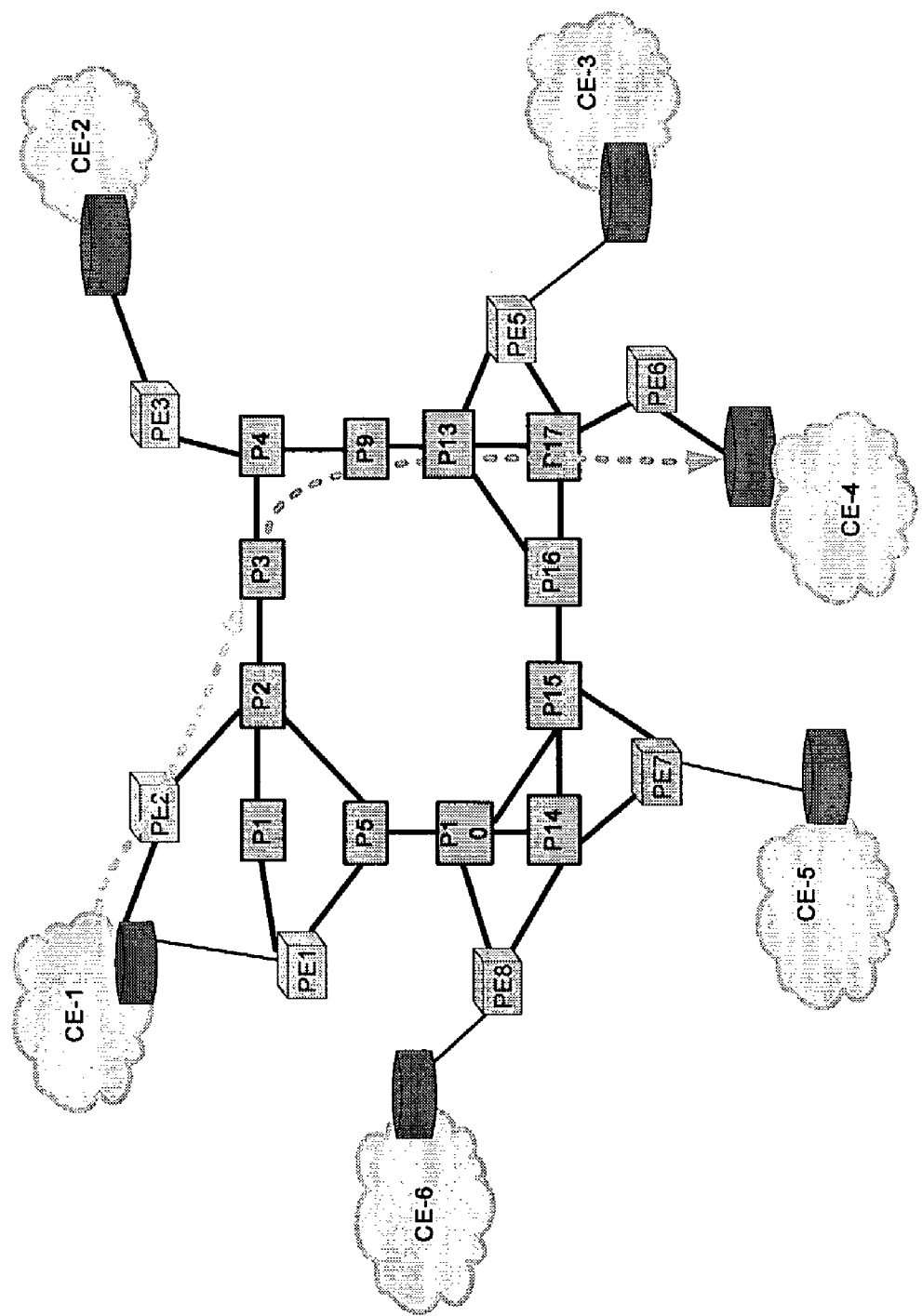
FIG. 7 is a diagram of a logical view of a VPSTN in accordance with an embodiment of the present invention.

FIG. 7 is a diagram of a logical view of a VPSTN in accordance with an embodiment of the present invention. FIG. 7 illustrates an example where CE-1 may initiate connectivity to P3 and P3 may also initiate dynamic connectivity to CE4. The two connections may be advertised as TE-links. In addition, CE-1 and CE-4 may be customers of a VPSTN customer (e.g., carrier's carrier model).

Figure 8:
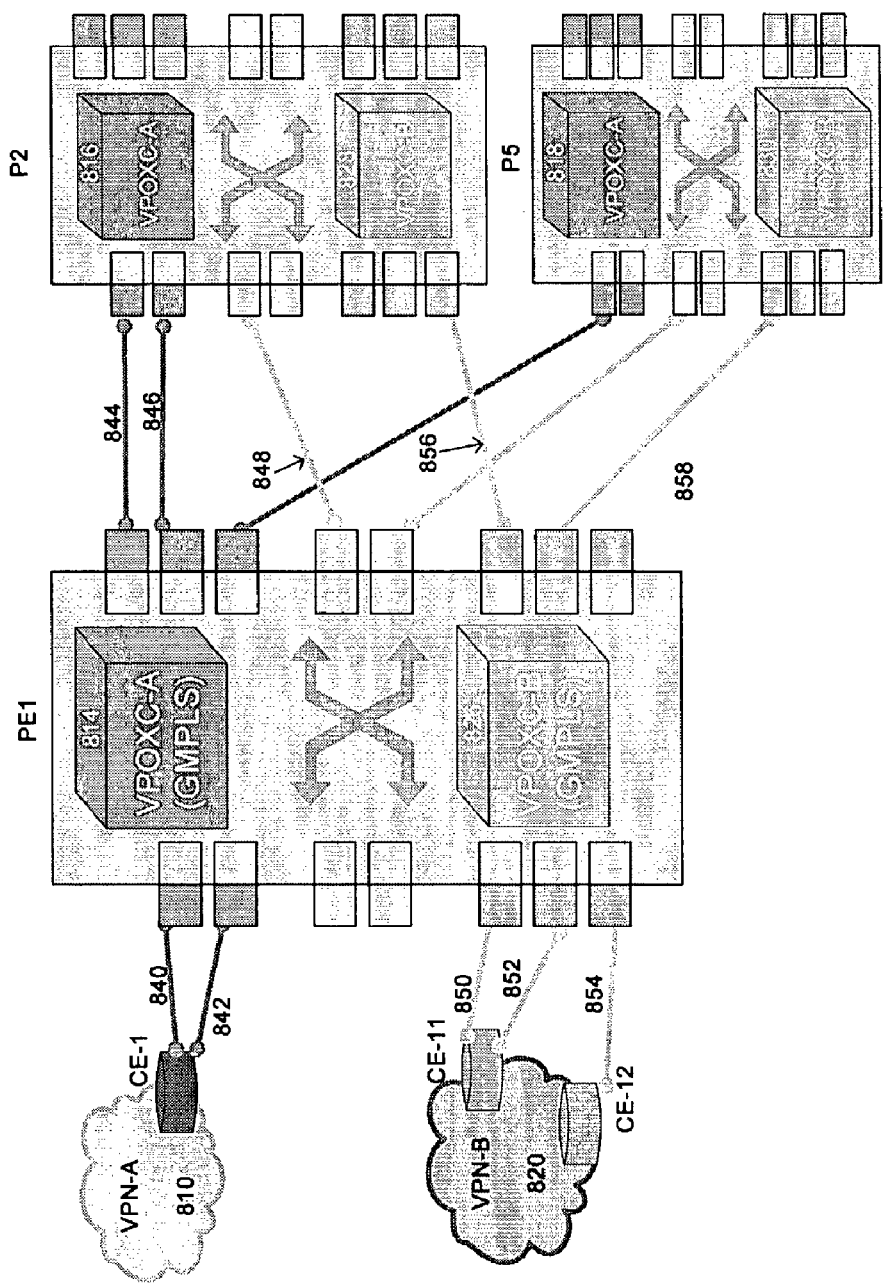
FIG. 8 is a diagram illustrating a VPSTN using VPOXCs instantiated at a node level in accordance with an embodiment of the present invention.

FIG. 8 is a diagram illustrating a VPSTN using VPOXCs instantiated at a node level in accordance with an embodiment of the present invention. A deployment may be similar to a virtual router (VR) based layer 3 VPN, as being a standardized Internet Engineering Task Force (IETF) provider provisioned VPNs deployment scenario. In this example, VPN-A 810 supports CE-1. CE-1 may be connected to PE1 and associated with VPOXC-A 814 via 840 and 842, which is connected to P2 and associated with VPOXC-A 816 via 844 and 846. VPOXC-A 814 may connect to P5 and associated with VPOXC-A 818 via 848. VPN-B 820 may include CE-11 connected to PE1 and associated with VPOXC-B 826 via 850 and 852. VPN-B 820 may also include CE-12 connected to PE1 and associated with VPOXC-B 826 via 854. PE1 may connect to P2 via VPOXC-B 826 and VPOXC-B 828, as shown by 856. VPOXC-B 826 may connect to P5 and associated with VPOXC-B 830 via 858. Therefore, at the node level, PE and P devices may support multiple VPNs (e.g., VPN A and VPN B).

Another example of an embodiment of the present invention involves a VPSTN using a network-based VPOXC instantiated from multiple resources distributed across a set of physical nodes.

Figure 9:
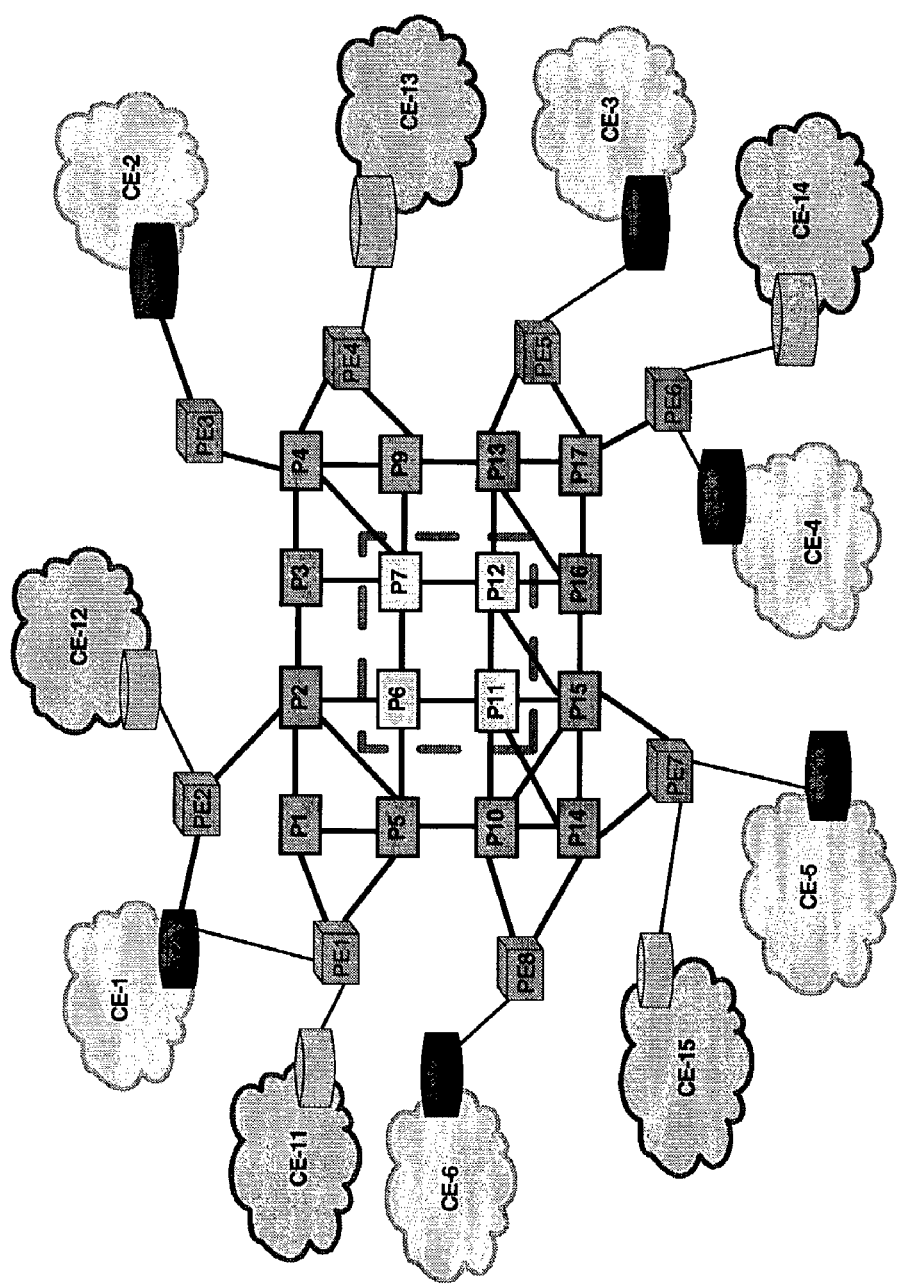
FIG. 9 is a diagram illustrating a network-based VPOXC in accordance with an embodiment of the present invention.
Figure 10:
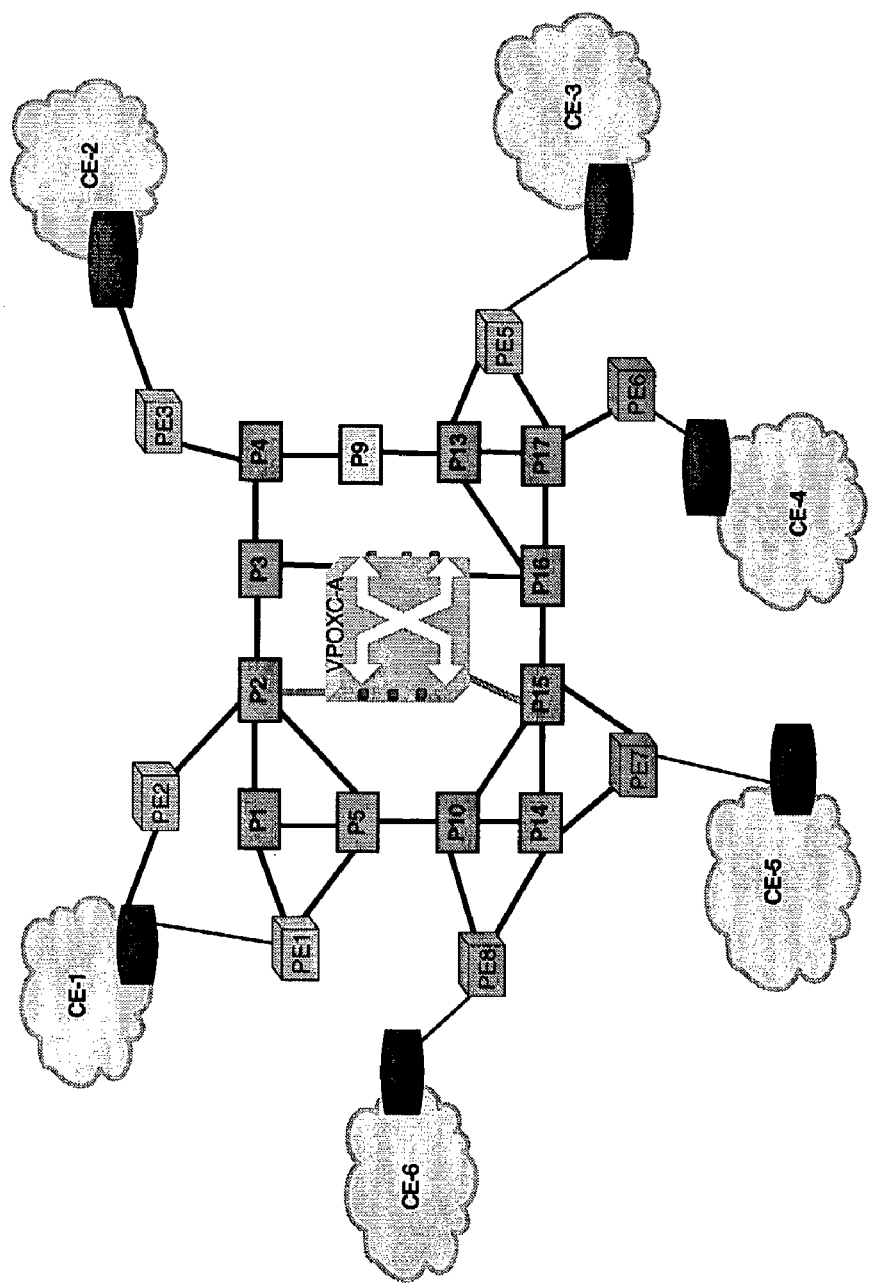
FIG. 10 is a diagram illustrating an instance of a VPOXC, in accordance with an embodiment of the present invention.

FIG. 9 is a diagram illustrating a network-based VPOXC in accordance with an embodiment of the present invention. A network based VPOXC may be formed from provider nodes P6, P7, P11 and P12. FIG. 10 is a diagram illustrating an instance of a VPOXC, in accordance with an embodiment of the present invention. As shown, some resources on provider nodes P6, P7, P11 and P12 may be abstracted by one instance of VPOXC-A.

Figure 11:
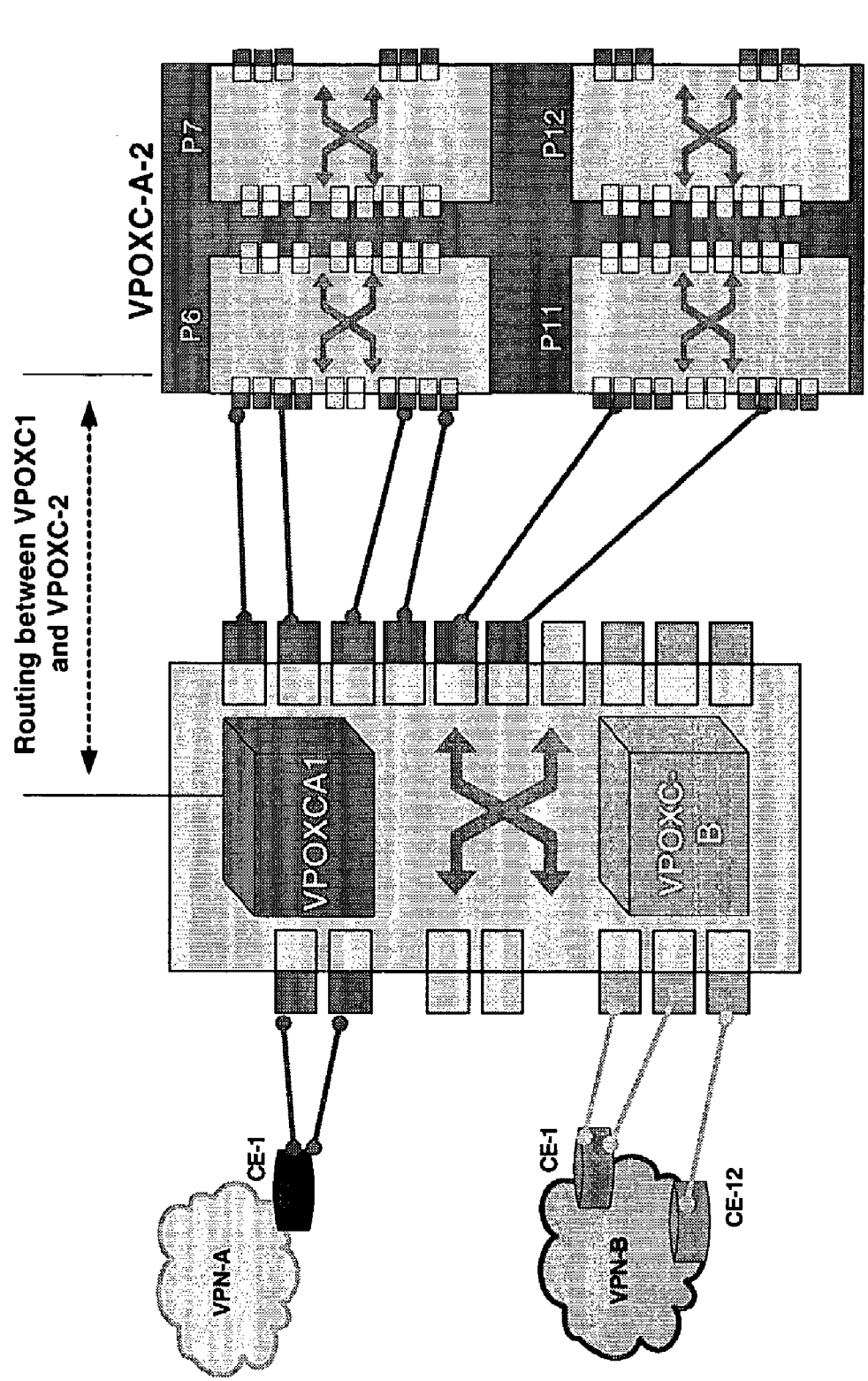
FIG. 11 is a diagram illustrating an example of a VPOXC in accordance with an embodiment of the present invention.

FIG. 11 is a diagram illustrating an example of a VPOXC in accordance with an embodiment of the present invention. In this example, a VPOXC-A2 is formed on nodes P6, P7, P11, and P12. As illustrated in FIG. 11, GMPLS routing may run between a nodal VPOXC-A1 and a network-based VPOXC-A2 and not with P6, 7, 11, or 12 routing instances.

Figure 12:
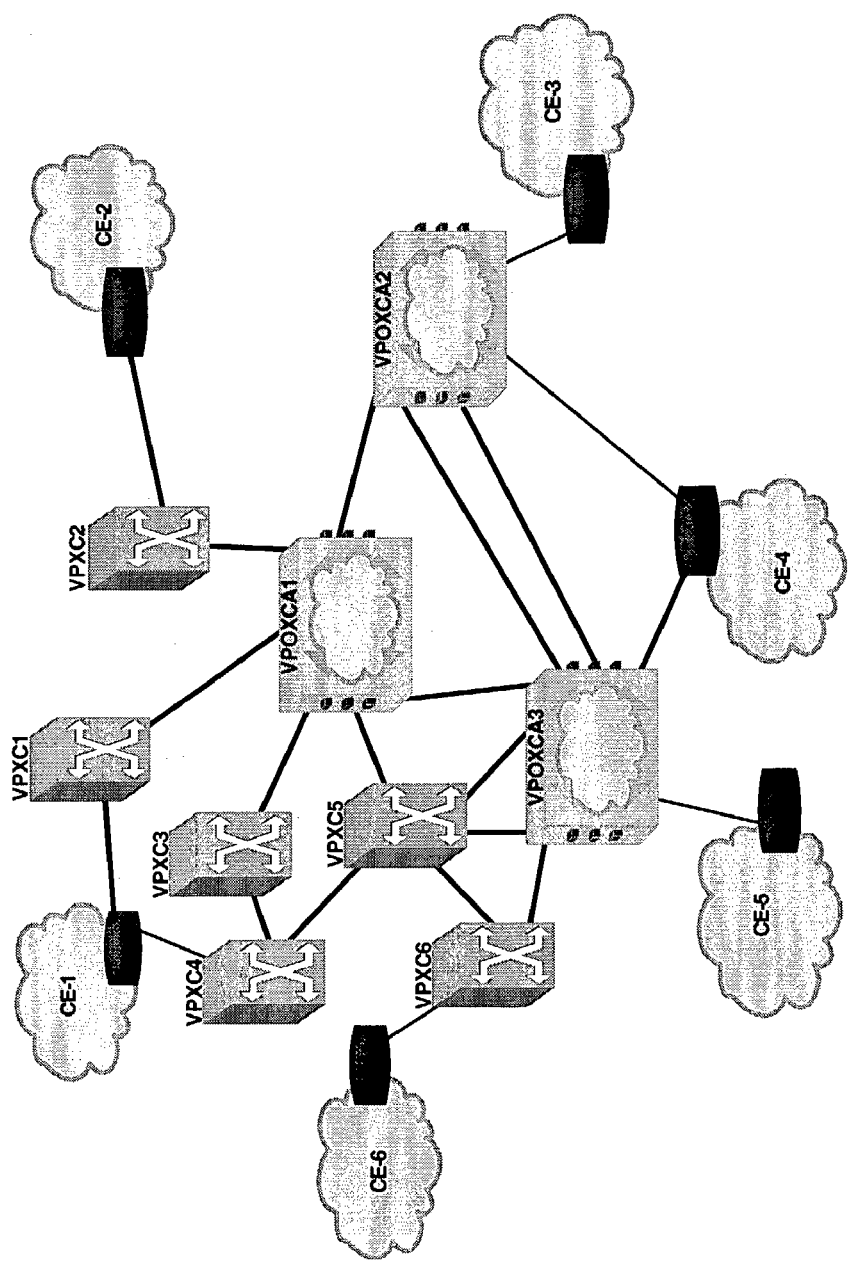
FIG. 12 is a diagram of a customer view of a partition in accordance with an embodiment of the present invention.

FIG. 12 is a diagram of a customer view of a partition in accordance with an embodiment of the present invention. The customer partition is under the customer's control and includes a network of nodal and network-based VPOXCs. Network-based VPOXCs are represented by VPOXC-A1, VPOXC-A2 and VPOXC-A3. A node-based VPXCs (e.g., a VPOXC configured on one physical device) are presented by VPXC1, VPXC2, VPXC3, VPXC4, VPXC5 and VPXC6.

At this point it should be noted that a technique for implementing virtual private optical switched transport network using virtual private optical cross-connect technology in accordance with the present invention as described above typically involves the processing of input data and the generation of output data to some extent. This input data processing and output data generation may be implemented in hardware or software. For example, specific electronic components may be employed in a node or similar or related circuitry for implementing the functions associated with implementing virtual private optical switched transport network using virtual private optical cross-connect technology in accordance with the present invention as described above. Alternatively, one or more processors operating in accordance with stored instructions may implement the functions associated with implementing virtual private optical switched transport network using virtual private optical cross-connect technology in accordance with the present invention as described above. If such is the case, it is within the scope of the present invention that such instructions may be stored on one or more processor readable media, or transmitted to one or more processors via one or more signals.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. A method for implementing a virtual private optical switched transport network using virtual private optical cross-connect technology, the method comprising the steps of:

partitioning a network into a plurality of private switch partitions, wherein the plurality of partitions are connected to each other via backbone links including one or more channels for communicating routing update information;

assigning each partition to a customer, wherein each partition is capable to be assigned to another customer without changing the private address assigned to the partition and used by a customer for requesting optical connectivity;

establishing a private switched network by allowing each customer to exclusively control each respectively assigned partition and assign a private address to the partition, wherein each partition comprises at least one virtual private optical cross connect for virtualizing at least one resource, wherein the network comprises a plurality of optical time division multiplexing cross connects;

adjusting bandwidth associated with the private switched network based on at least one of an addition and a removal of at least one site to the at least one virtual private optical cross connect; and provisioning customer optical connections at real time using label switch paths, wherein the optical connections is represented as a forwarding adjacency.

2. The method of claim 1, wherein the network is partitioned by a service provider.

3. The method of claim 1, wherein the customer is a private network running Generalized Multi-Protocol Label Switching.

4. The method of claim 1, further comprising the step of:
defining a virtual private optical cross connect topology to be supported by the service provider, wherein each customer defines the topology.

5. The method of claim 1, wherein the virtual private optical cross connect is implemented at one of a node level and a network level.

6. The method of claim 1, further comprising the step of: dynamically configuring the private switched network via dynamic routing.

7. A system for implementing a virtual private optical switched transport network using virtual private optical cross-connect technology, the system comprising:

a network having a plurality of private switch partitions, wherein the plurality of partitions are connected to each other via backbone links including one or more channels for communicating routing update information and a private switched network is established by allowing each customer to exclusively control each respectively assigned partition and assign a private address to the partition;

wherein each partition is capable to be assigned to another customer without changing the private address assigned to the partition and used by a customer for requesting optical connectivity; and at least one virtual private optical cross connect for virtualizing at least one resource associated with each partition, wherein the network comprises a plurality of optical time division multiplexing cross connects;

wherein bandwidth associated with the private switched network is adjusted based on at least one of an addition and a removal of at least one site to the at least one virtual private optical cross connect; and wherein customer optical connections are provisioned at real time using label switch paths, wherein the optical connections is represented as a forwarding adjacency.

8. The system of claim 7, wherein the network is partitioned by a service provider.

9. The system of claim 7, wherein the customer is a private network running Generalized Multi-Protocol Label Switching.

10. The system of claim 7, wherein the customer defines a virtual private optical cross connect topology to be supported by the service provider.

11. The system of claim 7, wherein the virtual private optical cross connect is implemented at one of a node level and a network level.

12. The system of claim 7, wherein the private switched network is dynamically configured via dynamic routing.

13. An article of manufacture for implementing a virtual private optical switched transport network using virtual private optical cross-connect technology, the article of manufacture comprising:

at least one processor readable carrier; and instructions carried on the at least one carrier;

wherein the instructions are configured to be readable from the at least one carrier by at least one processor and thereby cause the at least one processor to operate so as to:

partition a network into a plurality of private switch partitions, wherein the plurality of partitions are connected to each other via backbone links including one or more channels for communicating routing update information;

assign each partition to a customer, wherein each partition is capable to be assigned to another customer without changing the private address assigned to the partition and used by a customer for requesting optical connectivity;

establish a private switched network by allowing each customer to exclusively control each respectively assigned partition and assign a private address to the partition, wherein each partition comprises at least one virtual private optical cross connect for virtualizing at least one resource, wherein the network comprises a plurality of optical time division multiplexing cross connects; and adjust bandwidth associated with the private switched network based on at least one of an addition and a removal of at least one site to the at least one virtual private optical cross connect;

wherein the customer is a private network running generalized multi-protocol label switching, wherein the private network is represented as a forwarding adjacency.

* * * * *